Nov. 23, 1943.  C. E. GOOD  2,334,819
ELECTRIC FISHING FLOAT
Filed Feb. 1, 1943
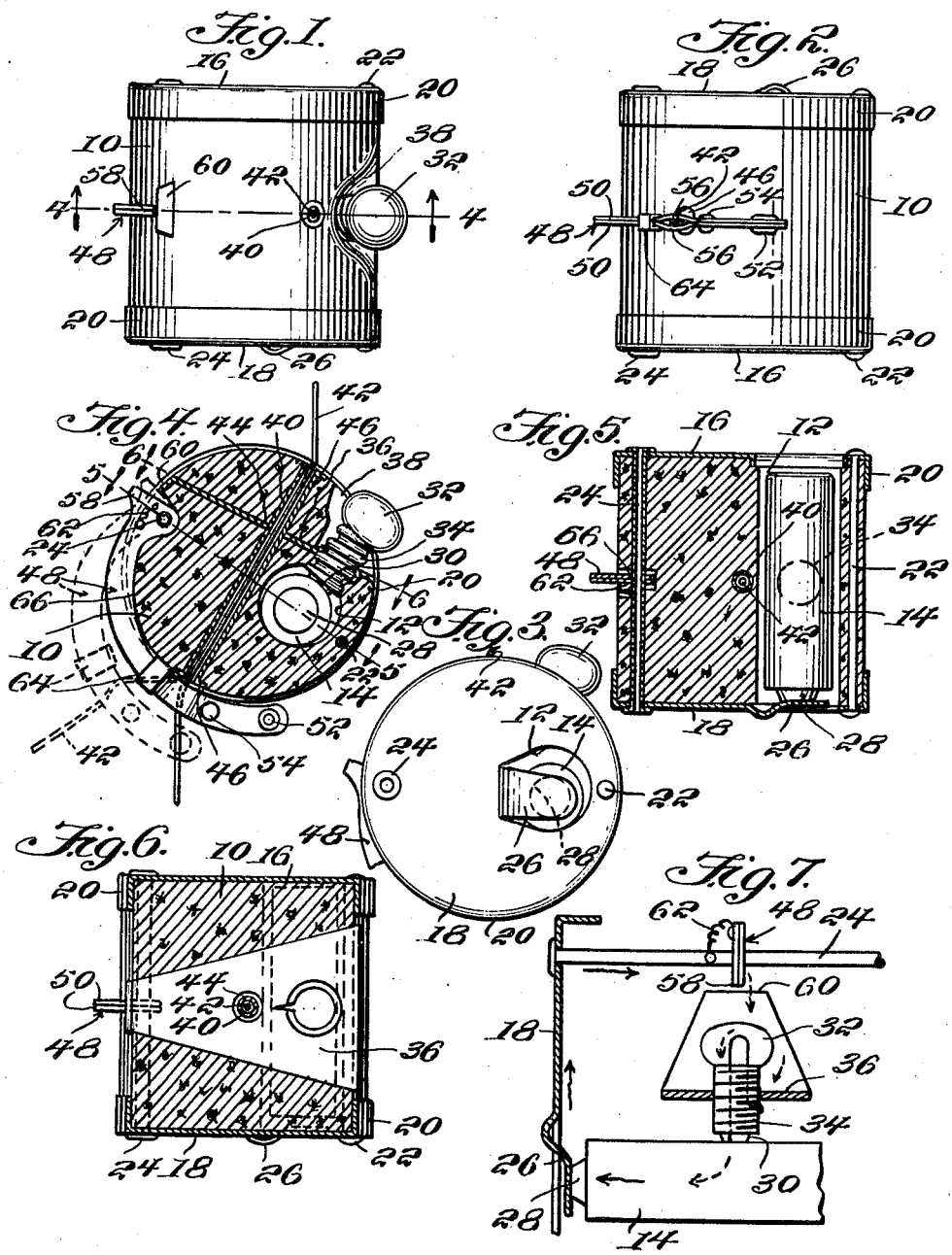
INVENTOR.
Cecil F. Good
BY
Victor J. Evans & Co.
ATTORNEYS Patented Nov. 23, 1943

2,334,819

UNITED STATES PATENT OFFICE 2,334,819

ELECTRIC FISHING FLOAT

Cecil E. Good, Wichita, Kans.

Application February 1, 1943, Serial No. 474,352

4 Claims. (Cl. 43—17)

My invention relates to fish line floats, and has among its objects and advantages the provision of an improved electrically illuminated float so devised as to illuminate an electric lamp when a fish tugs at the line.

In the accompanying drawing:

Figure 1 is a top plan view of a float in accordance with my invention;

Figure 2 is a bottom plan view;

Figure 3 is an end view;

Figure 4 is a sectional view along the line 4—4 of Figure 1;

Figure 5 is a sectional view along the line 5—5 of Figure 4;

Figure 6 is a sectional view along the line 6—6 of Figure 4; and

Figure 7 is a fragmentary view illustrating the metallic parts of the float which coact to provide a closed circuit when a pull is exerted on the line.

In the embodiment selected to illustrate my invention, I make use of a float body 10, such as cork, which body is of cylindrical contour and is provided with a longitudinal bore 12 for accommodating a battery 14. Metallic plates 16 and 18 extend across the end faces of the body 10 and have flanges 20 pressed onto the end margins of the body. A rivet 22 extends longitudinally through the body 10 closely adjacent its peripheral face and through the plates 16 and 18 for attaching the plates to the body. A tubular rivet 24 also extends longitudinally through the body 10 diametrically opposite the rivet 22 and through the plates 16 and 18 for plate attaching purposes.

Plate 18 is formed with a contact 26 engaging the battery terminal 28, and the contact 30 of a lamp 32 engages the side of the battery 14. Lamp 32 includes the usual screw contact 34 threadedly connected with a contact plate 36 extending transversely through the body 10. A recess 38 is provided in the body 10 for accommodating the lamp 32.

The body 10 is provided with a transverse bore for the reception of a tube 40 having an inside diameter sufficiently large to freely receive the fish line 42. An opening 44 is provided in the contact plate 36 through which the line tube 40 is passed. The ends of the tube 40 are upset at 46 to hold the tube against accidental longitudinal displacement.

To the rivet 24 is pivotally connected one end of a line clamp and switch arm 48. Arm 48 comprises two metal straps 50 fixedly connected one with the other at their ends by tubular rivets 52, one of which rivets loosely embraces the rivet 24 to pivotally connect the arm with this rivet. Straps 50 are additionally connected one with the other at 54 closely adjacent the rivet 52 at the free end of the arm 48. The straps 50 are provided with aligned bowed formations 56 which provide an opening through which the line 42 may be pulled without resistance.

The line 42 is provided with the usual hook and sinker at its lower end and the line is fixedly secured to the arm 48 by drawing the line between the two straps 50. Thus the straps 50 function as a clamp for securing the line 42, and the line is normally positioned closely adjacent the rivet 54, as in Figure 4.

In operation, the body 10 normally floats in the position shown in Figure 4. The arm 48 is provided with a contact end 58 arranged to engage the end 60 of the contact plate 44. Under normal conditions, the end 58 is spaced from the end 60 notwithstanding the sinker pull on the arm 48. In the position of Figure 4, the rivet 24 is so positioned that the sinker pull effective on the arm 48 is prevented from pivoting the arm to bring the end 58 into engagement with the end 60. The sinker weight is selected in accordance with the balancing characteristics of the float to cause the latter to normally float in the position of Figure 4. When an additional pull is exerted on the hook end of the line, such a pull imparts anticlockwise rotation (see Figure 4) to the body 10, which in turn causes the end 58 to engage with the end 60. When such engagement takes place, the circuit through the lamp 32 is closed, since a conductor wire 62 electrically connects with the rivet 24.

Figure 7 illustrates the circuit as including the plate 18 which is in current conducting engagement with the rivet 24. Should the fish release the line, the body 10 immediately assumes its normal position of Figure 4 for breaking the circuit through the lamp 32. Thus the body 10 constitutes a float so balanced as to rotate to a circuit closing position whenever additional pull is exerted on the line, as by a fish tugging at the line.

The float is so designed as to facilitate adjustment of the line 42. The two straps 50 firmly clamp the line in any desired position. Contact 26 is sufficiently resilient to maintain effective current conducting engagement with the battery terminal 28, and the battery is secured against accidental longitudinal shifting in the bore 12 by reason of the lamp structure, which is screwed firmly thereagainst. The curvature of the arm 48 and the location of its pivot with respect to the normal balance of the float 10 are such as to provide good circuit closing engagement between the end 58 and the plate end 60 when additional pull is exerted on the line.

A band 64 is slidable on the straps 50 to clamp the straps firmly against the line 42 in the event that the resiliency of the straps is insufficient to secure the necessary fixed connection between the arm and the line. The body 10 is also provided with a groove 66 which provides accommodation for portions of the arm lying within the contour of the body.

Without further elaboration, the foregoing will so fully illustrate my invention, that others may, by applying current knowledge, readily adapt the same for use under various conditions of service.

I claim:

1. A fish line float comprising a buoyant body provided with an opening loosely receiving the line, said body being balanced to float in a predetermined position, an electric lamp and a circuit therefor incorporated in said body, said circuit having a contact fixed to said body, and a switch arm having a pivotal connection with said body arranged for circuit closing engagement with said contact, said switch arm having a fixed connection with the line and the sinker end of the line depending from said switch arm, said switch arm being spaced from said contact in said predetermined position of said body, the pivotal connection between the switch arm and said body being located to cause rotation of the body when a predetermined pull is exerted on the sinker end of the line to bring the switch arm into circuit closing engagement with said contact.

2. The invention described in claim 1 wherein said switch arm comprises two juxtaposed metallic straps between which the line is clamped.

3. The invention described in claim 1 wherein said body is provided with a bore, a battery located in said bore comprising a portion of said circuit, and a plate comprising a continuation of said contact, said lamp being threadedly connected with said plate and engaging the battery to clamp the latter against the wall of said bore.

4. The invention described in claim 1 wherein said body is of cylindrical configuration, with said opening extending transversely therethrough and at an angle to the vertical in said predetermined position of the body, said body comprising cork and having metallic plates at its ends, and rivets extending longitudinally through said body for fixedly securing the metallic plates thereto, one of said plates comprising a portion of said circuit, and one of said rivets comprising a pivot for said switch arm, the latter being curved substantially in conformity with the curvature of said body.

CECIL E. GOOD.